United States Patent
Li et al.

(10) Patent No.: US 9,996,188 B2
(45) Date of Patent: Jun. 12, 2018

(54) TOUCH SUBSTRATE AND FABRICATION METHOD THEREOF AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Jun Li, Beijing (CN); Ming Hu, Beijing (CN); Lei Zhang, Beijing (CN); Xiaodong Xie, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 38 days.

(21) Appl. No.: 15/114,211
(22) PCT Filed: Nov. 24, 2015
(86) PCT No.: PCT/CN2015/095408
§ 371 (c)(1),
(2) Date: Jul. 26, 2016
(87) PCT Pub. No.: WO2016/201891
PCT Pub. Date: Dec. 22, 2016

(65) Prior Publication Data
US 2017/0147124 A1 May 25, 2017

(30) Foreign Application Priority Data
Jun. 15, 2015 (CN) .......................... 2015 1 0329463

(51) Int. Cl.
*G06G 3/00* (2006.01)
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01);
(Continued)

(58) Field of Classification Search
CPC ........... G06F 2203/04111; G06F 3/044; G06F 3/0412; G06F 3/0416; G06F 2203/04103; G06F 2203/04107
See application file for complete search history.

(56) References Cited

U.S. PATENT DOCUMENTS

| 2010/0182275 A1 | 7/2010 | Saitou |
| 2012/0062515 A1* | 3/2012 | Teng ....................... G06F 3/044 345/174 |

(Continued)

FOREIGN PATENT DOCUMENTS

| CN | 102346611 A | 2/2012 |
| CN | 104281351 A | 1/2015 |

(Continued)

OTHER PUBLICATIONS

The First Office Action dated Jun. 9, 2017; Appln. No. 201510329463.7.

(Continued)

*Primary Examiner* — Muhammad N Edun
(74) *Attorney, Agent, or Firm* — Ladas & Parry LLP; Loren K. Thompson (57) ABSTRACT

A touch substrate is provided, comprising a touch region. The touch region includes a first electrode layer and a second electrode layer which are provided on a base substrate (1) and are insulated from each other; the first electrode layer includes a plurality of sensing electrodes (4) provided along rows and columns and a first connection portion (8); the second electrode layer includes a second connection portion (2); adjacent sensing electrodes (4) in a same row are connected with each other by the first connection portion (8); adjacent sensing electrodes (4) in a same column are connected with each other by the second connection portion (2); the first connection portion (8) and the second connection portion (2) cross with each other and insulate from each other; a side of the first electrode layer away from the second electrode layer is provided with connection wires (7) connected with the sensing electrodes (4), and the connection wires (7) are configured to transmit a touch drive signal or a touch detection signal; and the connection wires (7) are led out from a same side of the touch substrate. A fabrication method of the touch substrate and a display apparatus are provided to realize a non-frame or narrow-frame design.

19 Claims, 4 Drawing Sheets

(52) U.S. Cl.
CPC .............. *G06F 2203/04103* (2013.01); *G06F 2203/04107* (2013.01); *G06F 2203/04111* (2013.01)

(56) References Cited

U.S. PATENT DOCUMENTS

| | | |
|---|---|---|
| 2013/0100073 A1 | 4/2013 | Wang et al. |
| 2016/0103519 A1 | 4/2016 | Zeng et al. |
| 2016/0162070 A1 | 6/2016 | He et al. |

FOREIGN PATENT DOCUMENTS

| | | |
|---|---|---|
| CN | 104407758 A | 3/2015 |
| CN | 104461158 A | 3/2015 |
| CN | 10436616 A | 4/2015 |
| CN | 204256697 A | 4/2015 |
| CN | 104866142 A | 8/2015 |

OTHER PUBLICATIONS

International Search Report and Written Opinon dated Mar. 18, 2016; PCT/CN2015/095408.

\* cited by examiner

TOUCH SUBSTRATE AND FABRICATION METHOD THEREOF AND DISPLAY APPARATUS

TECHNICAL FIELD

Embodiments of the present disclosure relate to a touch substrate and a fabrication method thereof and a display apparatus.

BACKGROUND

For a conventional One Glass Solution (OGS) touch screen, in order to achieve a precise touch effect, a part of a frame of the touch screen is configured to contain a driving circuit. However, for ease of use and aesthetic requirements, the demand of current digital products on a narrow frame (that is, a non-display region of the screen of the digital products is required to have a very narrow width) is more and more urgent. In order to achieve a larger display region, a narrow-frame or even non-frame deign realized by reduction of the frame width is concerned.

SUMMARY

According to embodiments of the disclosure, a touch substrate is provided. The touch substrate comprises a touch region. The touch region includes a first electrode layer and a second electrode layer which are provided on a base substrate and insulated from each other, and the first electrode layer includes a plurality of sensing electrodes provided along rows and columns and a first connection portion; the second electrode layer includes a second connection portion; adjacent sensing electrodes in a same row are connected with each other by the first connection portion; adjacent sensing electrodes in a same column are connected with each other by the second connection portion; the first connection portion and the second connection portion cross with each other and insulate from each other; and a side of the first electrode layer away from the second electrode layer is provided with connection wires connected with the sensing electrodes, the connection wires are configured to transmit a touch drive signal or a touch detection signal, and the connection wires are led out from a same side of the touch substrate.

For example, orthographic projections of the connection wires on the first electrode layer are provided in the touch region.

For example, the orthographic projections of the connection wires on the first electrode layer are provided between adjacent sensing electrodes.

For example, the touch substrate further comprises a second insulation layer provided on the side of the first electrode layer away from the second electrode layer. The connection wires are connected with the sensing electrodes through via holes provided in the second insulation layer and corresponding to the sensing electrodes in position.

For example, each row of the sensing electrodes are led out by one connection wire; and each column of the sensing electrodes are led out by one connection wire.

For example, the second insulation layer is provided with grooves, and each of the grooves extends to the same side of the touch substrate by taking a corresponding via hole as a start point.

For example, orthographic projections of the grooves on the first electrode layer are provided between the sensing electrodes.

For example, the connection wires are formed of a transparent conductive material.

For example, the transparent conductive material comprises a nano-silver material.

For example, bottom surfaces of the grooves are provided with a signal shielding layer.

For example, a surface of the signal shielding layer has a coarse surface.

For example, the surface of the signal shielding layer has trenches or protrusions.

For example, the connection wires are provided on the signal shielding layer.

According to embodiments of the disclosure, a fabrication method of a touch substrate is provided. The method comprises: forming a first electrode layer and a second electrode layer which are insulated from each other on a base substrate, wherein the first electrode layer includes a plurality of sensing electrodes provided along rows and columns and a first connection portion, the second electrode layer includes a second connection portion, adjacent sensing electrodes in a same row are connected with each other by the first connection portion, adjacent sensing electrodes in a same column are connected with each other by the second connection portion, and the first connection portion and the second connection portion cross with each other and insulate from each other; and a side of the first electrode layer away from the second electrode layer is provided with connection wires connected with the sensing electrodes, the connection wires are configured to transmit a touch drive signal or a touch detection signal, and the connection wires are led out from a same side of the touch substrate.

For example, the method further comprises: forming a second insulation layer on the side of the first electrode layer away from the second electrode layer, and forming via holes corresponding to the sensing electrodes in position in the second insulation layer; and forming the connection wires on the second insulation layer. The connection wires are connected with the sensing electrodes through the via holes.

For example, the method further comprises: forming a second insulation layer on the side of the first electrode layer away from the second electrode layer, and forming via holes corresponding to the sensing electrodes in position and grooves in the second insulation layer with a dual-tone mask, wherein each of the grooves extends to the same side of the touch substrate by taking a corresponding via hole as a start point; and forming the connection wires on the second insulation layer. The connection wires are connected with the sensing electrodes through the via holes.

For example, the method further comprises: forming a signal shielding layer in the grooves; and forming the connection wires on the signal shielding layer.

For example, a surface of the signal shielding layer has trenches or protrusions.

For example, orthographic projections of the connection wires on the first electrode layer are provided between the sensing electrodes.

According to embodiments of the disclosure, a display apparatus is provided. The display apparatus comprises the touch substrate as described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
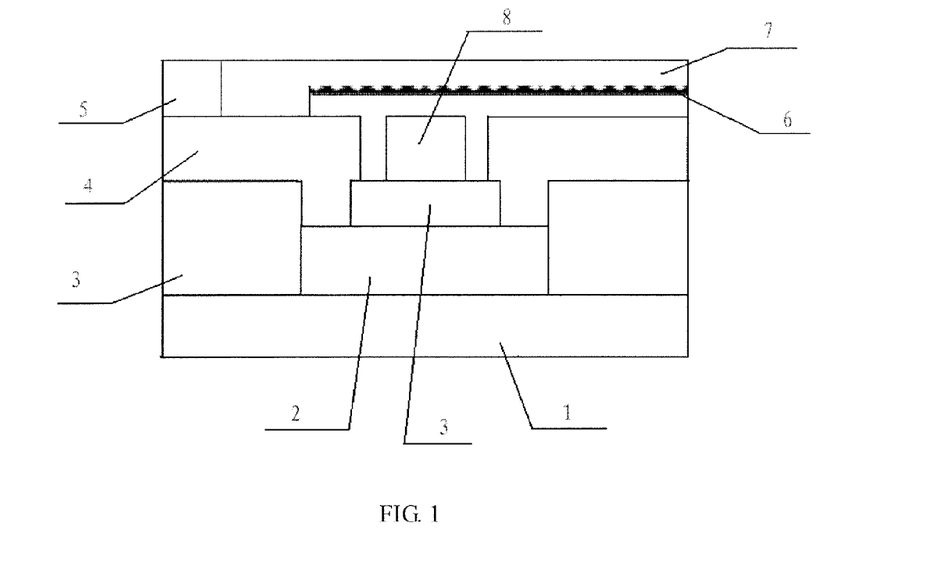
FIG. 1 is a sectional schematic view illustrating a touch substrate according to embodiments of the present disclosure.
Figure 2:
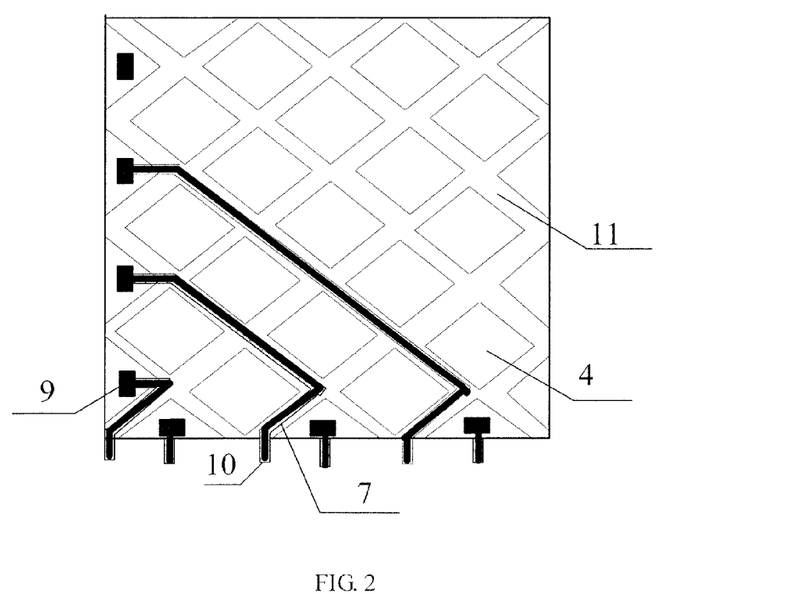
FIG. 2 is a schematic top-view illustrating the touch substrate according to the embodiments of the present disclosure.
Figure 3:
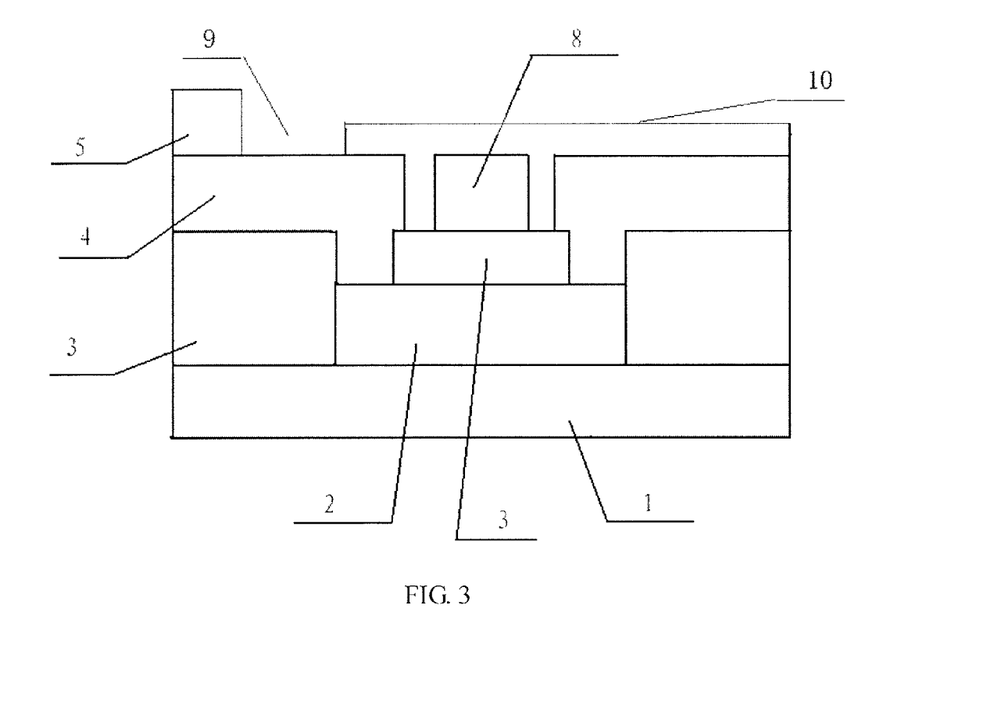
FIG. 3 is a sectional schematic view illustrating a via hole and a groove in a second insulation layer of the touch substrate according to the embodiments of the present disclosure.

As shown in FIG. 1-FIG. 3, embodiments of the present disclosure provide a touch substrate, and the touch substrate comprises a touch region. The touch region includes a first electrode layer and a second electrode layer which are provided on a base substrate 1 and insulated from each other, the first electrode layer includes a plurality of sensing electrodes provided along rows and columns and a first connection portion 8; the second electrode layer includes a second connection portion 2; adjacent sensing electrodes 4 in a same row are connected with each other by the first connection portion 8; adjacent sensing electrodes 4 in a same column are connected with each other by the second connection portion 2; the first connection portion 8 and the second connection portion 2 cross with each other and insulate from each other; a side of the first electrode layer away from the second electrode layer is provided with connection wires 7 connected with the sensing electrodes, the connection wires 7 are configured to transmit a touch drive signal or a touch detection signal; and the connection wires 7 are led out from a same side of the touch substrate.

In the touch substrate according to the embodiments of the present disclosure, the connection wires 7 connecting with the sensing electrodes 4 are all led out from the same side of the touch substrate, thus realizing a non-frame or narrow-frame design.

For example, the same side of the touch substrate is a side of the touch substrate where a driving circuit is provided. For example, for a mobile phone comprises the touch substrate, the same side of the touch substrate is a side of the mobile phone provided with function keys (for example, a lower side of the mobile phone).

As shown in FIG. 2, in order to clearly denote a relationship among respective layers, a second insulation layer 5 is transparently shown in FIG. 2, and an arrangement manner of the sensing electrodes 4 and gap regions among adjacent sensing electrodes 4 are shown. The connection wires 7 and a signal shielding layer 6 are formed of a transparent material, but are indicated in black in the drawings in order to understand the relationship among the respective layers.

For example, orthographic projections of the connection wires 7 on the first electrode layer are provided in the touch region. Hence, the connection wires 7 are provided in the touch region, and thus a problem of a wider frame caused by the fact that the connection wires 7 are provided in a peripheral region is further avoided. Meanwhile, the connection wires 7 are more flexibly provided and more conveniently manufactured in the touch region, and a manufacturing cost is reduced.

For example, the orthographic projections of the connection wires 7 on the first electrode layer are provided between adjacent sensing electrodes, and thus, the problem of the wider frame caused by the fact that the connection wires 7 are provided in the peripheral region is avoided, and meanwhile influence of the connection wires 7 on signals of the sensing electrodes is weakened.

For example, the touch substrate according to the embodiments of the present disclosure further comprises the second insulation layer 5 provided on the side of the first electrode layer away from the second electrode layer, and the connection wires 7 are connected with the sensing electrodes 4 through via holes 9 provided in the second insulation layer 5 and corresponding to the sensing electrodes 4 in position.

By providing the connection wires 7 and the sensing electrodes 4 in different layers, the connection wires 7 are more flexibly and freely provided, and the connection wires 7 are more conveniently led out from the same side of the touch substrate.

Thus, the connection wires 7 are deigned into various patterns by comprehensively considering factors such as parasitic capacitance, noise and visibility, so that the connection wires are not required to route in the frame region to realize a non-frame design. That is to say, the connection wires 7 are provided according to actual demands (as long as the connection wires are not short-circuited with each other), for example, a linear parallel arrangement is adopted for the connection wires 7 in order to reduce the length of the connection wires 7.

As shown in FIG. 2 (FIG. 2 illustrates part of the connection wires 7), for example, each row of the sensing electrodes 4 are led out by one connection wire 7; and each column of the sensing electrodes 4 are led out by one connection wire 7.

Since each row or column of sensing electrodes 4 transmit a same touch drive signal or a same touch detection signal, each row or column of connected sensing electrodes 4 can be led out by one connection wire 7.

As shown in FIG. 1 and FIG. 2, for example, the second insulation layer 5 is provided with grooves 10 (portions filled by the connection wires 7 and the signal shielding layer 6 in the drawings), and each of the grooves 10 extends to the same side of the touch substrate by taking the corresponding via hole 9 as a start point. The grooves 10 in FIG. 2 are denoted by grid line part and at least part of each of the grooves 10 is covered by the corresponding connection wire 7.

The grooves 10 are configured to accommodate the connection wires 7, so that the connection wires 7 are conveniently formed by screen printing, the connection wires 7 are connected with the sensing electrodes 4 through the via holes 9 and are led out from the same side of the touch substrate.

For example, orthographic projections of the grooves 10 on the first electrode layer are provided between the sensing electrodes 4. Thus, in the case that the connection wires 7 are provided in the grooves 10, influences of the drive signal or detection signal transmitted by the connection wires 7 on touch detection are reduced.

As shown in FIG. 2, for example, the connection wires 7 are provided in parallel, so as to facilitate the manufacture of the connection wires 7.

For example, the connection wires 7 are formed of a transparent conductive material. Thus, light transmittance of the touch substrate is increased.

For example, the connection wires 7 are prepared from a nano-silver material. In the case that the connection wires 7 are formed from the nano-silver material, the sheet resistance of the connection wires 7 is reduced while ensuring transparency.

For example, bottom surfaces of the grooves 10 are provided with a signal shielding layer 6. For example, the signal shielding layer 6 is prepared from a transparent material.

For example, the signal shielding layer 6 has a coarse surface. The signal shielding layer 6 has the coarse surface, so that light is scattered by the coarse surface of the signal shielding layer 6 to achieve a shadow dispelling effect while shielding a signal. Because of the shadow dispelling effect by the signal shielding layer 6, the light shielding layer 6 itself and the connection wires 7 are not visible on a displayed image.

For example, the surface of the signal shielding layer 6 has trenches and/or protrusions to achieve the coarse surface. The light incident on the signal shielding layer 6 is scattered by the trenches or protrusions, so that the shadow dispelling effect is realized. It is understandable that the coarse surface of other forms is also feasible.

For example, the connection wires 7 are provided on the signal shielding layer 6. Thus, the connection wires 7 are provided in the grooves 10 to reduce the thickness of the touch substrate.

According to the embodiments of the present disclosure, there is further provided a fabrication method of a touch substrate. For example, the method comprises steps of: forming connection wires on a base substrate on which sensing electrodes are formed. The connection wires are connected with the sensing electrodes, the connection wires are configured to transmit a touch drive signal or a touch detection signal, and the connection wires are led out from a same side of the touch substrate.

For example, the fabrication method comprises:

Forming a second insulation layer on the base substrate with sensing electrodes by a patterning process, wherein the second insulation layer includes via holes exposing the sensing electrodes and grooves, each of the groove has one end connected with the corresponding via hole and the other end led out from the same side of the touch substrate;

Forming a signal shielding layer in the grooves;

Forming a coarse surface of the signal shielding layer; and

Forming the connection wires on the coarse surface of the signal shielding layer, wherein the connection wires are configured to transmit the touch drive signal or the touch detection signal.

For example, the signal shielding layer is formed by a screen printing method; the coarse surface of the signal shielding layer is formed by a friction method; and the connection wires is formed by a screen printing.

For example, the fabrication method according to the embodiments comprises of:

S1: forming a second electrode layer on a base substrate 1 by a patterning process, wherein the second electrode layer includes a second connection portion 2;

S2: forming a first insulation layer 3 on the base substrate 1 with the second connection portion 2 by a patterning process; and S3: forming a first electrode layer on the base substrate 1 with the first insulation layer 3 by a patterning process, wherein the first electrode layer includes a plurality of sensing electrodes 4 provided along rows and columns and a first connection portion 8; adjacent sensing electrodes 4 in a same row are connected with each other by the first connection portion 8; adjacent sensing electrodes 4 in a same column are connected with each other by the second connection portion 2; and the first connection portion 8 and the second connection portion 2 cross with each other and insulate from each other.

The fabrication method according to the embodiments further comprises:

S4: forming a second insulation layer and forming via holes and grooves in the second insulation layer;

As shown in FIG. 3, the second insulation layer 5 is coated on the base substrate 1 with the sensing electrodes 4, then a negative photoresist (or a positive photoresist) is coated, the photoresist is exposed and developed by using a dual-tone mask. The dual-tone mask includes a light-partially-transmitting region corresponding to the via holes 9 and a light-completely-transmitting region corresponding to the grooves 10, and hence, the exposure amount of the photoresist corresponding to the via holes 9 and the exposure amount of the photoresist corresponding to the grooves 10 are controlled. During etching the second insulating layer 5 with the exposed and developed photoresist as mask, the via holes 9 are formed to penetrate through the second insulating layer 5 and expose the sensing electrodes 4, while at the grooves 10, a part of the second insulation layer 5 is etched to form the grooves 10. The grooves 10 has one end connected with the corresponding via hole 9 and the other end led out from the same side of the touch substrate.

Figure 4:
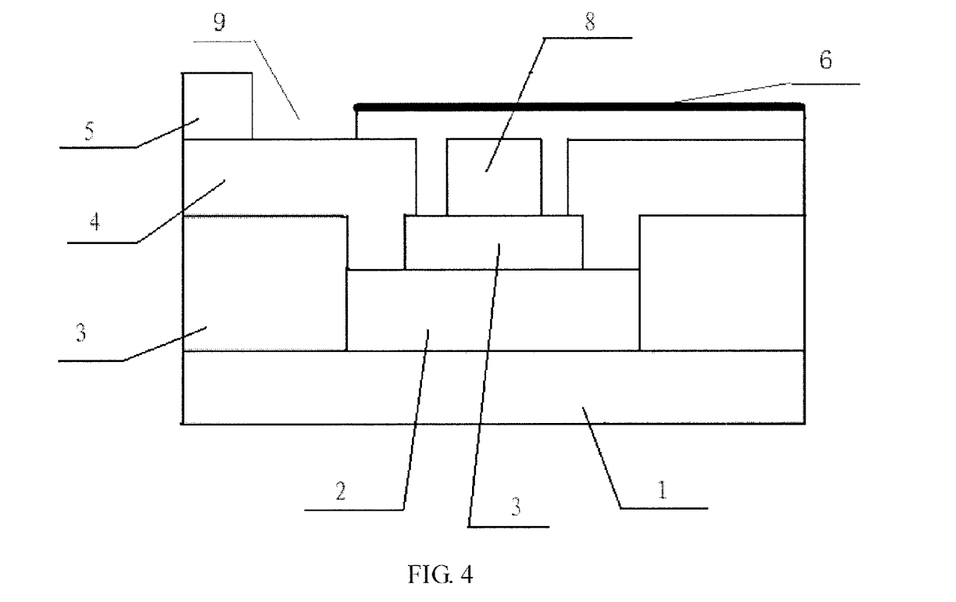
FIG. 4 is a sectional schematic view illustrating the touch substrate with a signal shielding layer according to the embodiment of the present disclosure.

S5: forming a signal shielding layer 6 in the grooves 10;

As shown in FIG. 4, the signal shielding layer 6 for example is formed by adopting a screen printing method, and a material for forming the signal shielding layer for example is selected from a SANTE series of products produced by CIMA Nano Tech Company.

Figure 5:
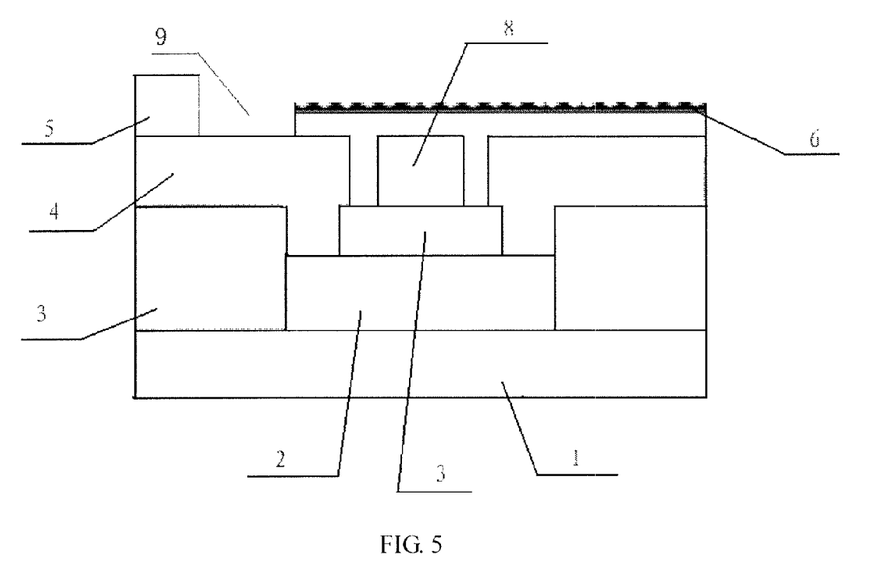
FIG. 5 is a sectional schematic view illustrating the signal shielding layer with a coarse surface according to the embodiments of the present disclosure.

S6: forming a coarse surface of the signal shielding layer 6;

For example, the coarse surface of the signal shielding layer 6 is formed with a friction method. As shown in FIG. 5, the signal shielding layer is rubbed with a roller with a coarse surface to form the coarse surface of the signal shielding layer 6. It should be understood that, the surface of the roller is provided to be a surface with trenches or a surface with protrusions, and thus, the surface with the trenches or the surface with the protrusions is formed on the signal shielding layer 6. In this way, while the signal shielding layer 6 achieves an external signal shielding effect to prevent the external signal from influencing the sensing electrodes 4, light scattering is performed on the coarse surface of the signal shielding layer 6 to achieve a shadow dispelling effect.

S7: forming connection wires 7 on the signal shielding layer 6.

For example, the connection wires 7 are formed by a screen printing method. For example, the connection wires 7 are formed by the screen printing method with nano-silver paste. The connection wires 7 have one ends connected with the sensing electrodes and the other ends led out from the same side of the substrate. For example, the connection wires 7 are prepared from a transparent conductive material. For example, the connection wires are prepared from a nano-silver material, and in this way, the sheet resistance of the connection wires 7 is smaller.

It should be understood that other functional layers may be prepared if necessary, which will not be repeated herein.

According to the embodiments of the present disclosure, there is also provided a display apparatus, and the display apparatus comprises the above-described touch substrate. For example, the touch region of the touch substrate corresponds to a display region for displaying of the display apparatus in position. The display apparatus for example is a touch screen, a liquid crystal display panel, an electronic paper, an OLED panel, a mobile phone, a tablet computer, a television, a display, a laptop, a digital photo frame, a navigator or any other product or part with a display function.

The foregoing embodiments merely are exemplary embodiments of the disclosure, and not intended to define the scope of the disclosure, and the scope of the disclosure is determined by the appended claims.

The application claims priority of Chinese Patent Application No. 201510329463.7 filed on Jun. 15, 2015, the disclosure of which is incorporated herein by reference in its entirety as part of the present application.

The invention claimed is:

1. A touch substrate, comprising a touch region, wherein the touch region includes a first electrode layer and a second electrode layer which are provided on a base substrate and insulated from each other, and the first electrode layer includes a plurality of sensing electrodes provided along rows and columns and a first connection portion;
the second electrode layer includes a second connection portion;
adjacent sensing electrodes in a same row are connected with each other by the first connection portion;
adjacent sensing electrodes in a same column are connected with each other by the second connection portion;
the first connection portion and the second connection portion cross with each other and insulate from each other; and
a side of the first electrode layer away from the second electrode layer is provided with connection wires connected with the sensing electrodes, the connection wires are configured to transmit a touch drive signal or a touch detection signal, and the connection wires are led out from a same side of the touch substrate,
wherein orthographic projections of the connection wires on the first electrode layer are provided in the touch region.

2. The touch substrate according to claim 1, wherein the orthographic projections of the connection wires on the first electrode layer are provided between adjacent sensing electrodes.

3. The touch substrate according to claim 1, further comprising a second insulation layer provided on the side of the first electrode layer away from the second electrode layer, wherein the connection wires are connected with the sensing electrodes through via holes provided in the second insulation layer and corresponding to the sensing electrodes in position.

4. The touch substrate according to claim 3, wherein the second insulation layer is provided with grooves, and each of the grooves extends to the same side of the touch substrate by taking a corresponding via hole as a start point.

5. The touch substrate according to claim 4, wherein orthographic projections of the grooves on the first electrode layer are provided between the sensing electrodes.

6. The touch substrate according to claim 4, wherein bottom surfaces of the grooves are provided with a signal shielding layer.

7. The touch substrate according to claim 6, wherein a surface of the signal shielding layer has a coarse surface.

8. The touch substrate according to claim 7, wherein the surface of the signal shielding layer has trenches or protrusions.

9. The touch substrate according to claim 6, wherein the connection wires are provided on the signal shielding layer.

10. The touch substrate according to claim 1, wherein each row of the sensing electrodes are led out by one connection wire; and each column of the sensing electrodes are led out by one connection wire.

11. The touch substrate according to claim 1, wherein the connection wires are formed of a transparent conductive material.

12. The touch substrate according to claim 11, wherein the transparent conductive material comprises a nano-silver material.

13. A display apparatus, comprising the touch panel according to claim 1.

14. A fabrication method of a touch substrate, comprising:
forming a first electrode layer and a second electrode layer which are insulated from each other on a base substrate, wherein the first electrode layer includes a plurality of sensing electrodes provided along rows and columns and a first connection portion, the second electrode layer includes a second connection portion, adjacent sensing electrodes in a same row are connected with each other by the first connection portion, adjacent sensing electrodes in a same column are connected with each other by the second connection portion, and the first connection portion and the second connection portion cross with each other and insulate from each other; and
a side of the first electrode layer away from the second electrode layer is provided with connection wires connected with the sensing electrodes, the connection wires are configured to transmit a touch drive signal or a touch detection signal, and the connection wires are led out from a same side of the touch substrate,
wherein orthographic projections of the connection wires on the first electrode layer are provided in the touch region.

15. The fabrication method of the touch substrate according to claim 14, further comprising:
forming a second insulation layer on the side of the first electrode layer away from the second electrode layer, and forming via holes in the second insulation layer, the via holes being corresponding to the sensing electrodes in position; and
forming the connection wires on the second insulation layer,
wherein the connection wires are connected with the sensing electrodes through the via holes.

16. The fabrication method of the touch substrate according to claim 14, further comprising:
forming a second insulation layer on the side of the first electrode layer away from the second electrode layer, and forming via holes corresponding to the sensing electrodes in position and grooves in the second insulation layer with a dual-tone mask, wherein each of the grooves extends to the same side of the touch substrate by taking a corresponding via hole as a start point; and forming the connection wires on the second insulation layer, wherein the connection wires are connected with the sensing electrodes through the via holes.

17. The fabrication method of the touch substrate according to claim 16, further comprising:

forming a signal shielding layer in the grooves; and forming the connection wires on the signal shielding layer.

18. The fabrication method of the touch substrate according to claim 17, wherein a surface of the signal shielding layer has trenches or protrusions.

19. The fabrication method of the touch substrate according to claim 16, wherein orthographic projections of the connection wires on the first electrode layer are provided between the sensing electrodes.

* * * * *